(12) United States Patent
Chang

(10) Patent No.: US 6,892,619 B1
(45) Date of Patent: May 17, 2005

(54) CIRCULAR SAW

(76) Inventor: Chin-Chin Chang, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 0 days.

(21) Appl. No.: 10/728,025

(22) Filed: Dec. 4, 2003

(51) Int. Cl.⁷ .............................................. B23D 19/00
(52) U.S. Cl. .............................. 83/490; 83/478; 30/388
(58) Field of Search ............................ 30/388; 83/471, 83/471.1, 471.12, 471.3, 472, 473, 474, 475, 83/476, 477, 477.1, 477.2, 478, 479, 480, 83/481, 482, 483, 484, 485, 486, 486.1, 487, 83/488, 489, 490, 491, 492, 493, 494

(56) References Cited

U.S. PATENT DOCUMENTS 3,721,141 A * 3/1973 Frostad ........................ 83/478
5,046,390 A * 9/1991 Sasaki ....................... 83/471.2
5,161,443 A * 11/1992 Huang ......................... 83/169
2003/0121160 A1 * 7/2003 Chang .......................... 30/391

FOREIGN PATENT DOCUMENTS

GB          2 111 192 A    *  6/1983

* cited by examiner

Primary Examiner—Hwei-Siu Payer

(57) ABSTRACT

A circular saw includes a base member abutting a supporting surface and an operating arm pivotally mounted to the base member. A gearbox is formed on a free end of the operating arm. The gearbox includes a first cavity and a second cavity respectively laterally defined in two opposite side of the gearbox. A hole is laterally defined in a bottom of the first cavity and communicates with the second cavity. A handle extends from the gearbox for user to easily operate the circular saw. A motor is laterally securely mounted to the bottom of the first cavity and partially received in the first cavity in the gearbox. A blade device is laterally mounted to the second side of the gearbox and connected to the motor so that the blade device is driven when the motor is operated.

2 Claims, 3 Drawing Sheets

CIRCULAR SAW

BACKGROUND OF THE INVENTION

1. Field of the Invention

The present invention relates to a circular saw, and more particularly to a circular saw that is easily operated.

2. Description of Related Art

A convention circular saw usually includes a base member and an operating arm pivotally mounted to the base member. The operating arm is reciprocally circularly moved relative to the base member. A gearbox is defined in a free end of the operating arm. A motor and a saw blade are respectively mounted to two opposite sides of the gearbox and each has a shaft engaged to each other in the gearbox. On the basis of safety, a housing extends from the gearbox for covering the saw blade. A handle extending from the gearbox for user to downward operate the motor with the saw blade for sawing workpiece.

For transmitting a greater torsion to the saw blade, the shafts of the motor and the saw blade are designed as short as possible so that the width of the gearbox is limited. As a result, the handle should be close to the housing. Consequently, the user's back of a hand may be rubbed against the housing so that the structure of the conventional circular saw needs to be advantageously altered.

The present invention has arisen to mitigate and/or obviate the disadvantages of the conventional circular saw.

SUMMARY OF THE INVENTION

The main objective of the present invention is to provide an improved circular saw that includes a handle far away from a blade device for an easy operation.

To achieve the objective, the circular saw in accordance with the present invention comprises a base member abutting a supporting surface and an operating arm pivotally mounted to the base member. A gearbox is formed on a free end of the operating arm. The gearbox includes a first cavity and a second cavity respectively laterally defined in two opposite side of the gearbox. A hole is laterally defined in a bottom of the first cavity and communicates with the second cavity. A handle extends from the gearbox for user to easily operate the circular saw. A motor is laterally securely mounted to the bottom of the first cavity and partially received in the first cavity in the gearbox. A blade device is laterally mounted to the second side of the gearbox and connected to the motor so that the blade device is driven when the motor is operated.

The width of the gearbox can be widened whatever the lengths of the teethed shaft of the motor and the axle of the blade device are, because the motor is partially received in the first cavity in the gearbox, that is, the distance between the handle and the housing is elongated.

Further benefits and advantages of the present invention will become apparent after a careful reading of the detailed description with appropriate reference to the accompanying drawings.

DETAILED DESCRIPTION OF THE INVENTION

Figure 1:
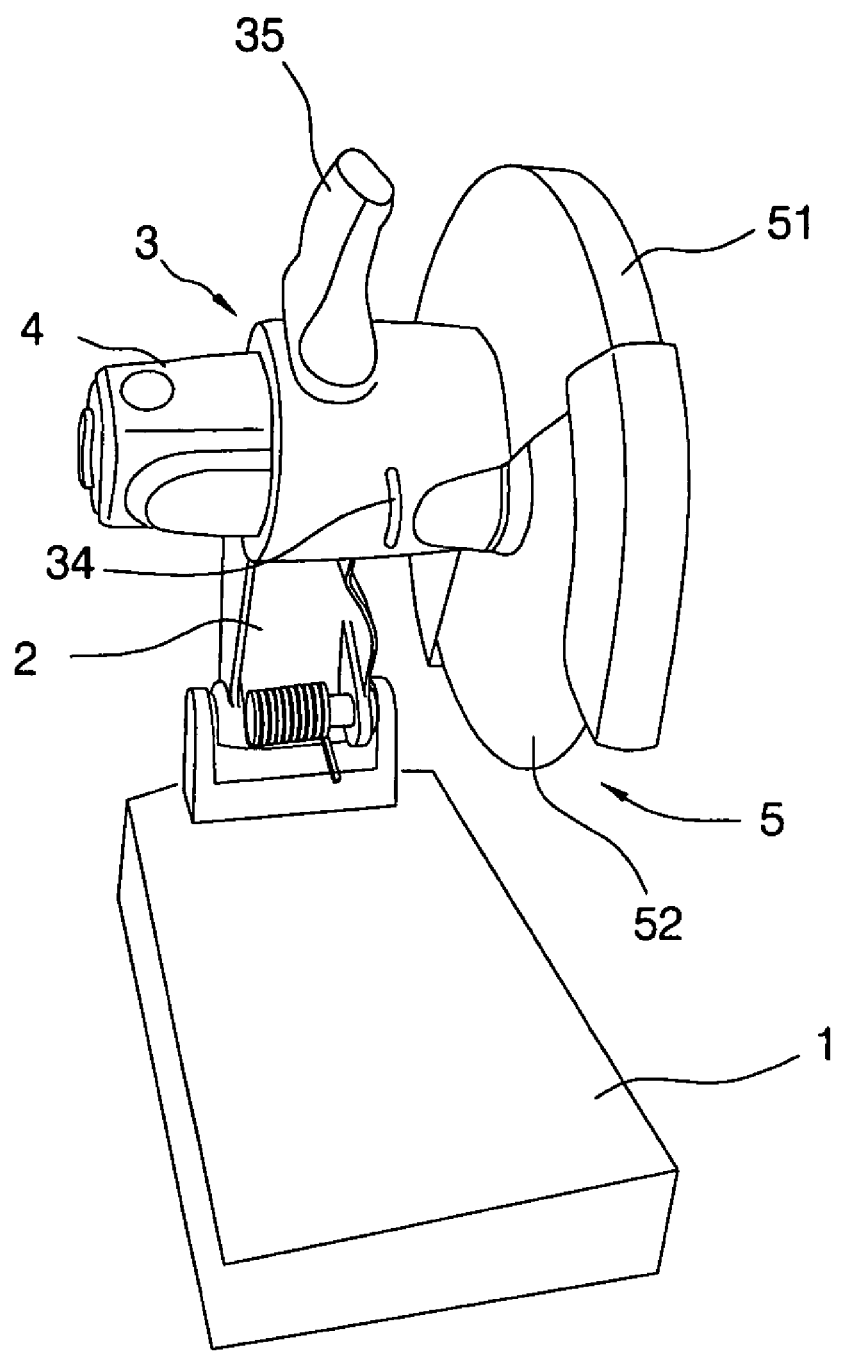
FIG. 1 is a perspective view of a circular saw in accordance with the present invention.
Figure 2:
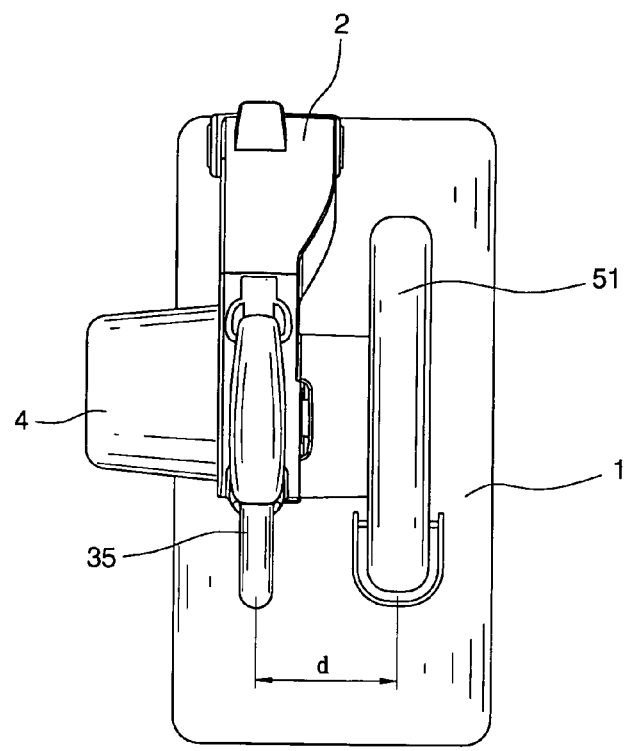
FIG. 2 is a top plan view of the circular saw in FIG. 1.
Figure 3:
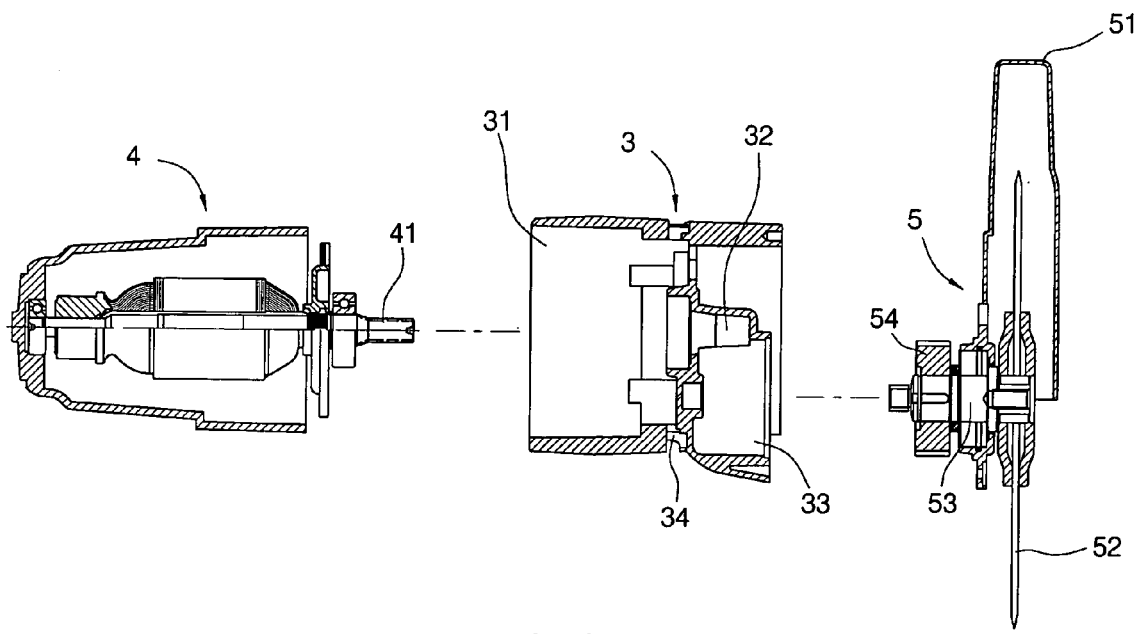
FIG. 3 is a partially exploded view in cross-section of the circular saw in FIG. 1.
Figure 4:
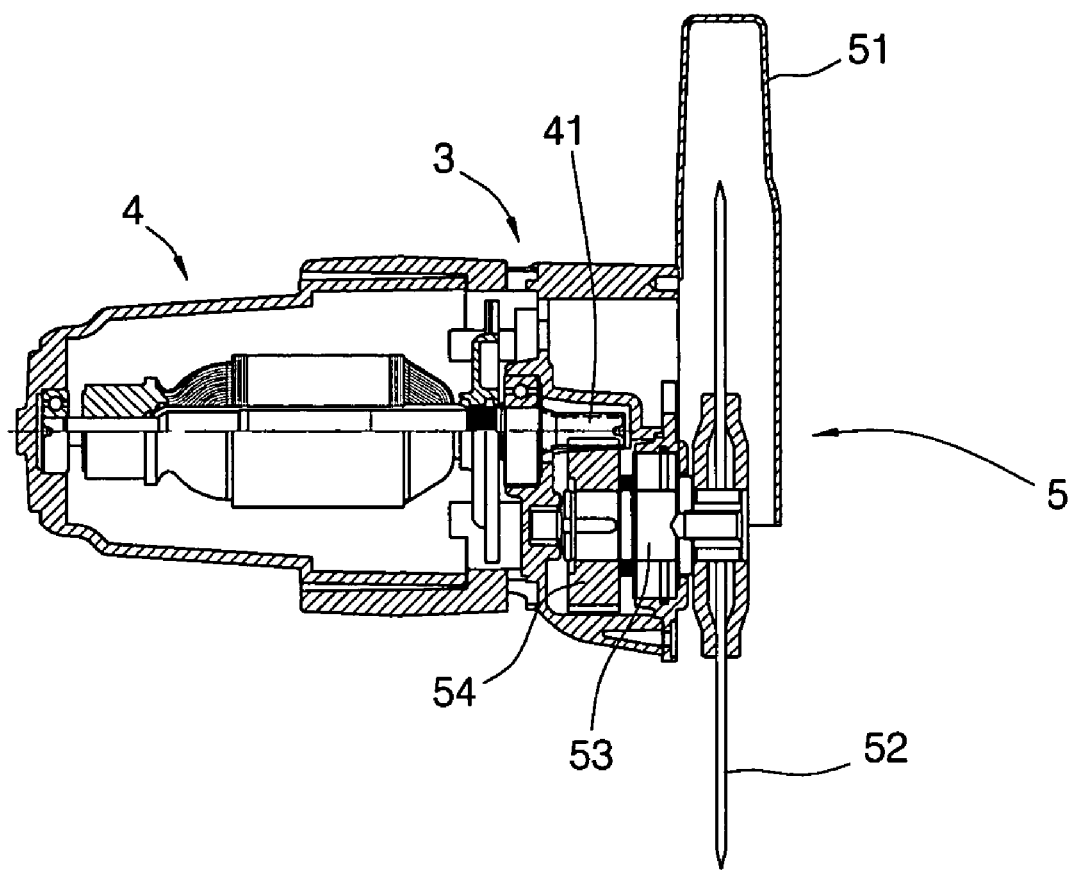
FIG. 4 is a cross-sectional view of the circular saw in FIG. 1.

Referring to the drawings and initially to FIGS. 1–4, a circular saw in accordance with the present invention comprises a base member (1) adapted to abut a supporting surface and an operating arm (2) pivotally mounted to the base member (1) so that the operating arm (2) is circularly moved relative to the base member (1). A gearbox (3) is formed on a free end of the operating arm (2). A motor (4) and a blade device (5) are respectively mounted to two opposite sides of the gearbox (3) and engaged to each other. The blade device (5) has a housing (51) mounted thereon for covering a saw blade (52) of the blade device (5).

The gearbox (3) includes a first cavity (31) laterally defined in a first side of the gearbox (3) and a hole (32) laterally defined in a bottom of the first cavity (31). A second cavity (33) is defined in a second side of the gearbox (3) and communicates with the hole (32) in the bottom of the first cavity (31). The gearbox (3) has a series of apertures (34) defined in an outer periphery of the gearbox (3) and communicating with the first cavity (31) for dissipating the heat from the motor (4) during being operated. A handle (35) extends from the outer periphery of the gearbox (3) for user to easily operate the circular saw.

The motor (4) is laterally securely mounted to the bottom of the first cavity (31) and partially received in the first cavity (31) in the gearbox (3). The motor (4) includes a teethed shaft (41) extending into the hole (32) in the bottom of the first cavity (31).

The blade device (5) is laterally mounted to the second side of the gearbox (3). The blade device (5) includes an axle (53) rotatably mounted therein. The axle (53) includes a first end extending into the second cavity (33) in the gearbox (3) and a second end centrally secured on the saw blade (52) for driving the saw blade (52). A gear (54) is laterally securely mounted to the first end of the axle (53) and engaged to the teethed shaft (41) of the motor (4) so that the saw blade (52) is rotated when the motor (4) is operated.

As described above, the motor (4) is partially received in the first cavity (31) in the gearbox (3) so that the width of the gearbox (3) can be widened whatever the lengths of the teethed shaft (41) of the motor (4) and the axle (53) of the blade device (5) are, that is, the distance (d) between the handle (35) and the housing (51) is elongated. Consequently, the handle (35) of the present invention can extend from a situation that is far away from the housing (51) of the blade device (5) to overcome the disadvantage of the conventional circular saw.

Although the invention has been explained in relation to its preferred embodiment, it is to be understood that many other possible modifications and variations can be made without departing from the spirit and scope of the invention as hereinafter claimed.

What is claimed is:

1. A circular saw comprising:
    a base member adapted to abut a supporting surface;
    an operating arm pivotally mounted to the base member so that the operating arm is circularly moved relative to the base member;
    a gearbox formed on a free end of the operating arm, the gearbox including a first cavity laterally defined in a first side of the gearbox, a hole laterally defined in a bottom of the first cavity, and a second cavity defined in a second side of the gearbox and communicating with the hole in the bottom of the first cavity;

a handle extending from an outer periphery of the gearbox for user to easily operate the circular saw;

a motor laterally securely mounted to the bottom of the first cavity and partially received in the first cavity in the gearbox, the motor including a teethed shaft extending into the hole in the bottom of the first cavity; and a blade device laterally mounted to the second side of the gearbox, the blade device having a saw blade and a housing for covering the saw blade, the blade device including an axle rotatably mounted therein, the axle including a first end extending into the second cavity in the gearbox and a second end centrally secured on the saw blade for driving the saw blade, a gear laterally securely mounted to the first end of the axle and engaged to the teethed shaft of the motor so that the saw blade is rotated when the motor is operated;

whereby the motor is partially received in the first cavity in the gearbox so that the width of the gearbox can be widened whatever the lengths of the teethed shaft of the motor and the axle of the blade device are, that is, the distance between the handle and the housing is elongated.

2. The circular saw as claimed in claim 1, wherein the gearbox comprises a series of apertures defined in the outer periphery of the gearbox and communicating with the first cavity for dissipating the heat from the motor.

* * * * *